United States Patent Office 3,154,746
Patented Oct. 27, 1964

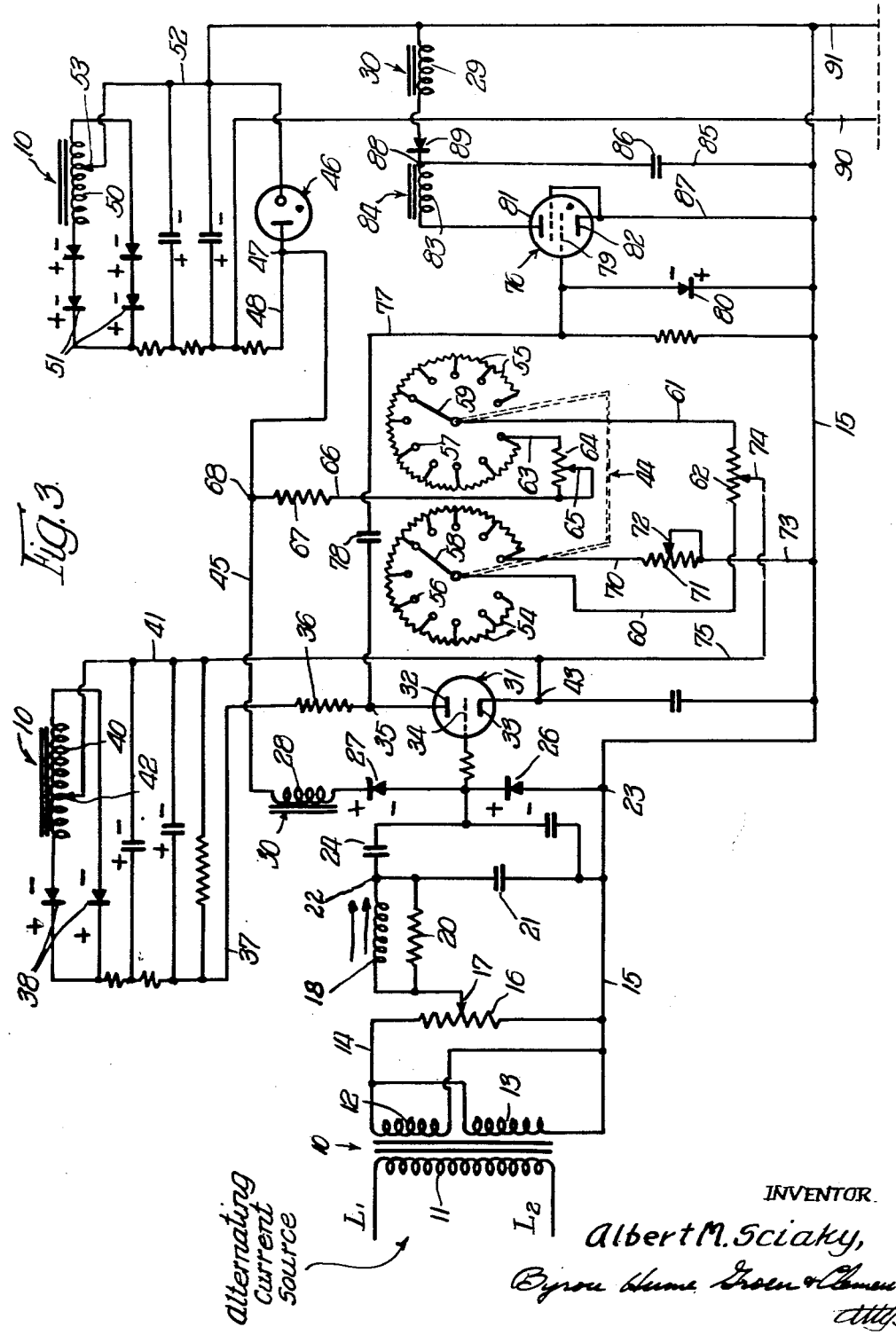

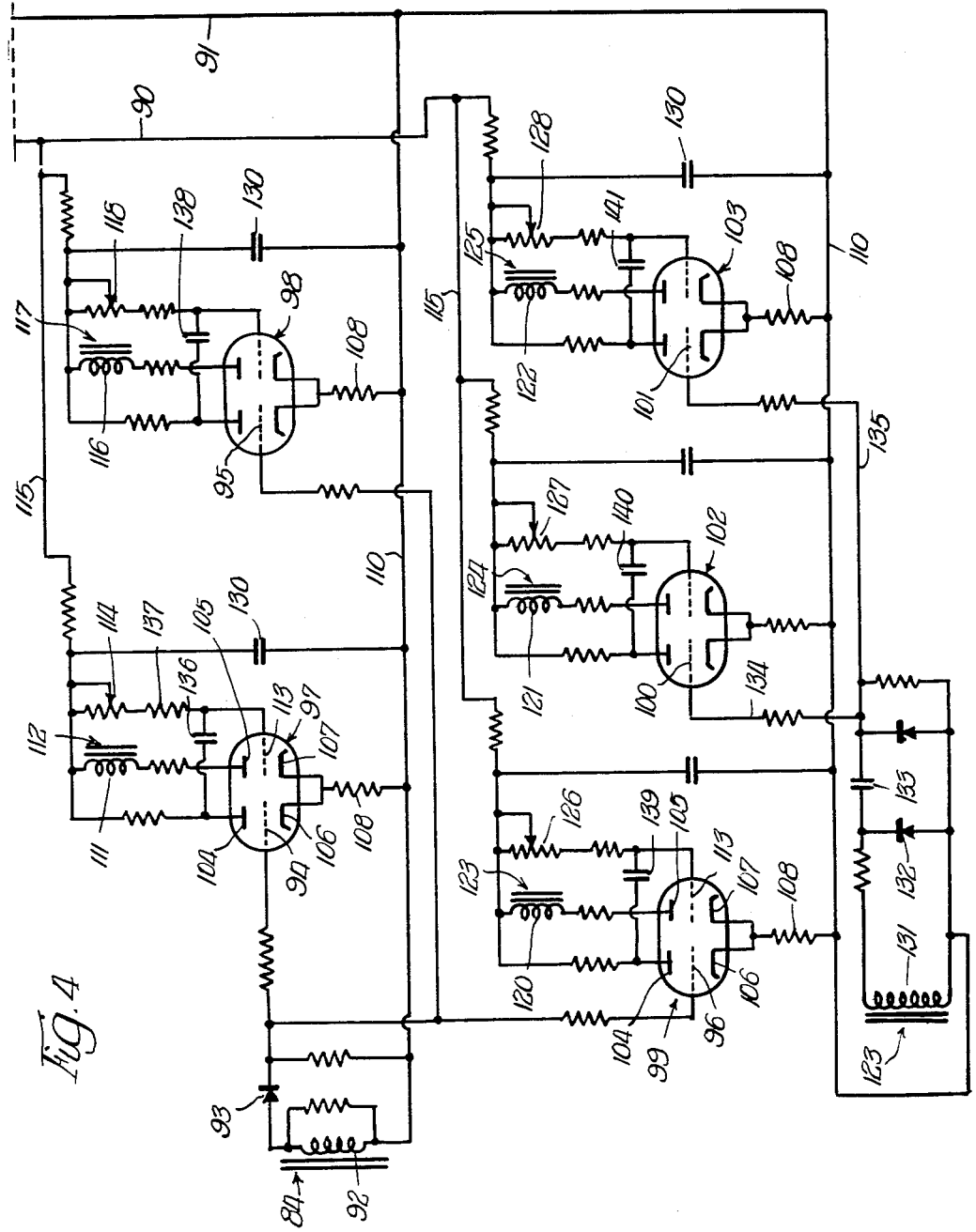

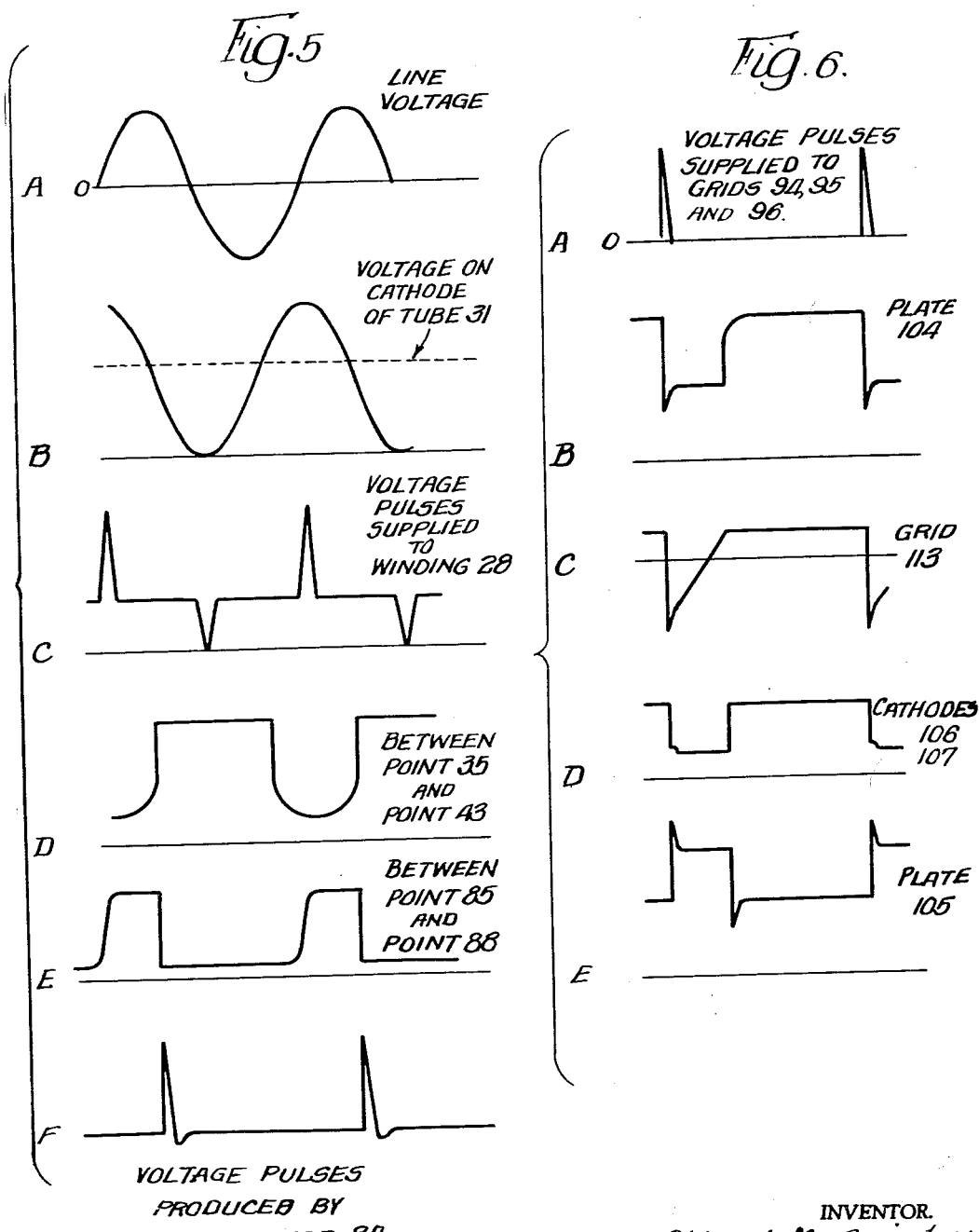

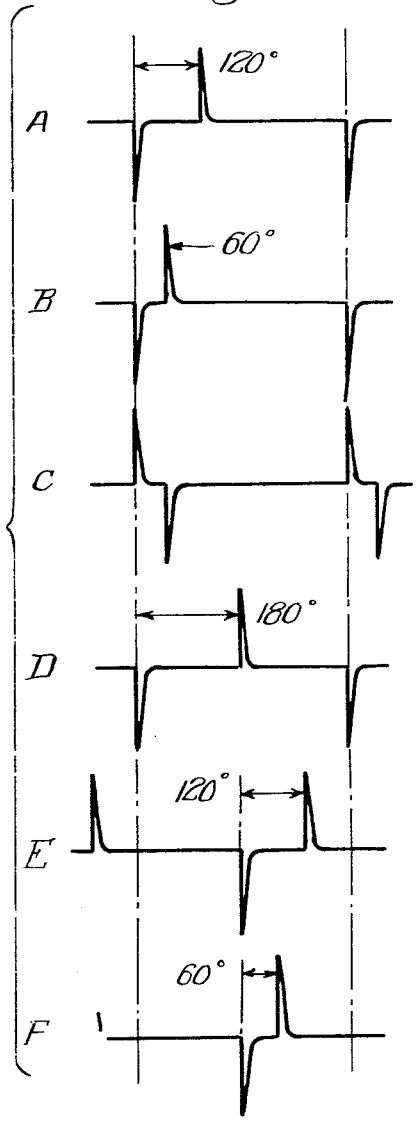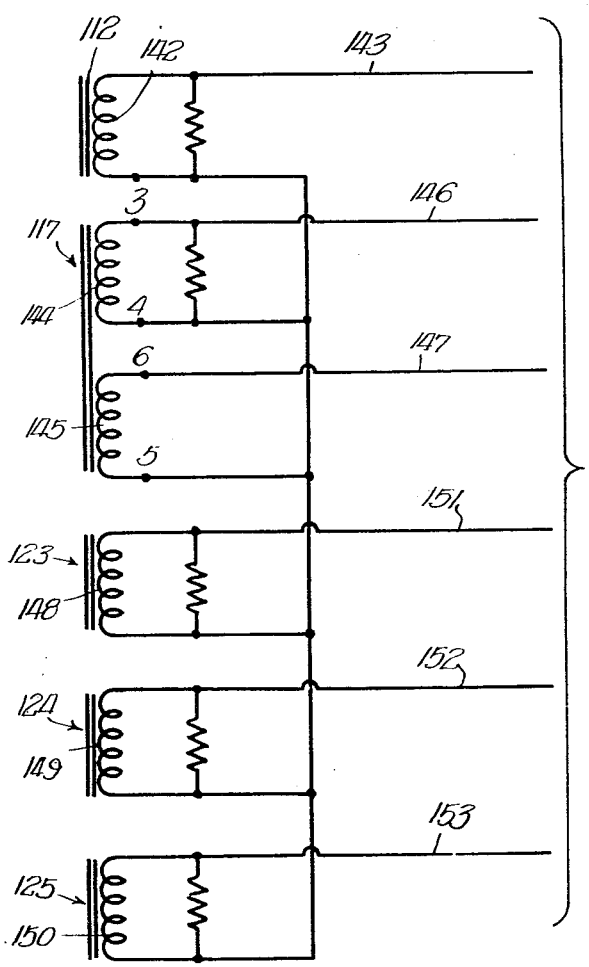

3,154,746
AUTOMATIC VOLTAGE COMPENSATOR
Albert M. Sciaky, Chicago, Ill., assignor to Welding Research, Inc., Chicago, Ill., a corporation of Illinois
Original application Dec. 2, 1958, Ser. No. 777,774. Divided and this application Jan. 24, 1962, Ser. No. 168,459
5 Claims. (Cl. 328—151)

The invention relates to automatic voltage compensators embodying improved phase shift circuit means and has reference more particularly to apparatus of this nature which will automatically compensate for voltage variations in the alternating current supplied to welding machines, for example, to maintain the welding current at a constant value for any particular heat setting.

Welding systems have been provided with phase shift control means wherein a particular value of welding current is obtained by shifting the firing point of the ignitrons which in turn control flow of the primary current to the welding transformer. Such phase shifting networks have generally required manual adjustment although some welding systems in the past have been provided with phase shifting networks which control the welding current by automatically adjusting the firing point of the ignitrons in such manner that it is a function of the line voltage or the welding current being produced.

In the present invention the variations in the voltage of the supply current are compensated for automatically by providing a voltage waveform which is synthesized from the voltage of said supply current so that its magnitude is proportional to the output of the welding machine at every phase angle in the range of firing angles of the said machine. For each cycle a firing pulse is produced at the moment the voltage waveform reaches some desired preset value. If the preset value is kept constant by means of a voltage regulator tube, a drop in line voltage will advance the firing angle, and, conversely, an increase in line voltage will retard the firing angle, thus keeping the secondary welding current of the machine substantially constant.

Another and more specific object of the invention is to provide a single phase compensating circuit which will embody an improved principle of operation wherein phase shifting occurs automatically in timed relation with and proportional to the magnitude of the variations occurring in the voltage of the supply current so that for any particular setting the output of the compensating circuit in the form of voltage pulses will be phase shifted automatically and continuously.

Another object is to provide a single phase compensating circuit of the character as described in combination with a plurality of constant delay monostable multivibrators and which are triggered by the output pulses of the compensating circuit for producing the necessary firing pulses for the electric discharge valves of a three-phase welding machine. The various firing pulses are thereby produced at the proper phase angle for their respective phase for any particular setting of the compensating circuit.

With these and various other objects in view the invention may consist of certain novel features of construction and operation as will be more fully described and particularly pointed out in the specification, drawings and claims appended thereto.

In the drawings, which illustrate an embodiment of the invention, and wherein like reference characters are used to designate like parts—

FIGURE 3 is a wiring diagram of a single phase compensating circuit embodying the improved phase shift network of the invention;

FIGURE 4 is a wiring diagram illustrating the manner of electrically connecting in parallel circuit arrangement the constant delay monostable multivibrators contemplated by the invention;

FIGURE 5 illustrates a number of voltage waveforms such as are produced at various locations in the circuit of FIGURE 3;

FIGURE 6 illustrates certain voltage waveforms such as are produced at various locations in the circuit of one of the multi-vibrators when a positive pulse is applied thereto;

FIGURE 7 is a schematic diagram illustrating the circuit connections from the multivibrators and which function in a manner to deliver the various firing pulses to the electric discharge valves of a three-phase welding machine; and FIGURE 8 illustrates a number of voltage waveforms such as are produced by the multivibrators and which are delivered by the output connections, respectively, of the circuit as shown in FIGURE 7.

Figure 1:
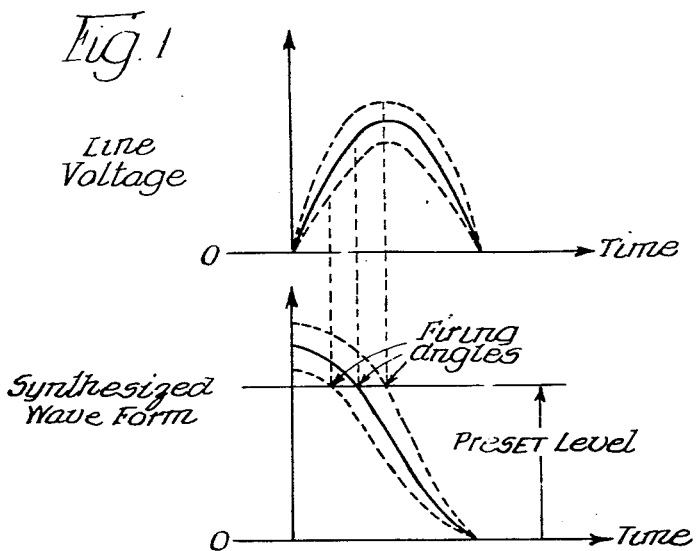
FIGURE 1 is a schematic diagram illustrating the shape of a synthesized waveform for a half cycle of conventional alternating voltage.

It is first of all necessary to synthesize a voltage waveform from the alternating current voltage supplied by the power lines. The magnitude of this waveform will be proportional to the output of the welding machine at every phase angle in the range of firing angles of the machine. Such a synthesized waveform is illustrated in diagrammatic form in FIGURE 1. Although it is difficult to determine theoretically the required waveform for a three-phase welding machine because of the nonlinear characteristics of the iron in the transformer, it can be stated that the main objective is to produce a constant average current int he load, notwithstanding the variations in the voltage of the source current. It is therefore necessary that the firing angles be such that the area under the voltage curve of the source will be constant. If the source voltage is expressed as $$E = E_{max} \sin \omega t$$

it can be shown by suitable computations, assuming a constant frequency and a constant load, that the waveform having a magnitude proportional to the average load current is given by the equation $$KI_{avg} = E_{max} + E_{max} \cos \omega t$$

where K is a constant of proportionality. The waveform as expressed by the above equation can be generated by means of the circuit as shown in FIGURE 2.

If $E_{max} \sin \omega t$ is expressed on the input terminals $L_1$ and $L_2$, the voltage across the condenser C1 will be $E_{max} \cos \omega t$, the voltage across C2 will be $E_{max}$, and the voltage across the rectifier DR1 will be $$E_{max} + E_{max} \cos \omega t$$

wherein it will be noted that condenser C1 is much larger in capacity than condenser C2. Should the input voltage increase, then C2 will be charged through DR1 to the new value of $E_{max}$. However, in the event the input voltage should decrease, it will be understood that another path must be provided for discharging C2 to its new low value of $E_{max}$. The discharge of C2 is done through the rectifier DR2. A strong negative pulse is supplied by the transformer TR2 at the time $E_{max} \cos \omega t$ has its maximum negative value and thus C2 is discharged in a very small fraction of a cycle to its new low value of $E_{max}$. Further discharge, however, is prevented by rectifier DR1 which acts as a short circuit for the pulse as soon as the voltage across C2 becomes equal to the voltage across C1. The components for the circuit of FIGURE 2 must be chosen so that the voltage drop across rectifiers DR1 and DR2 is small and the leakage resistance of C1 is high.

Figure 2:
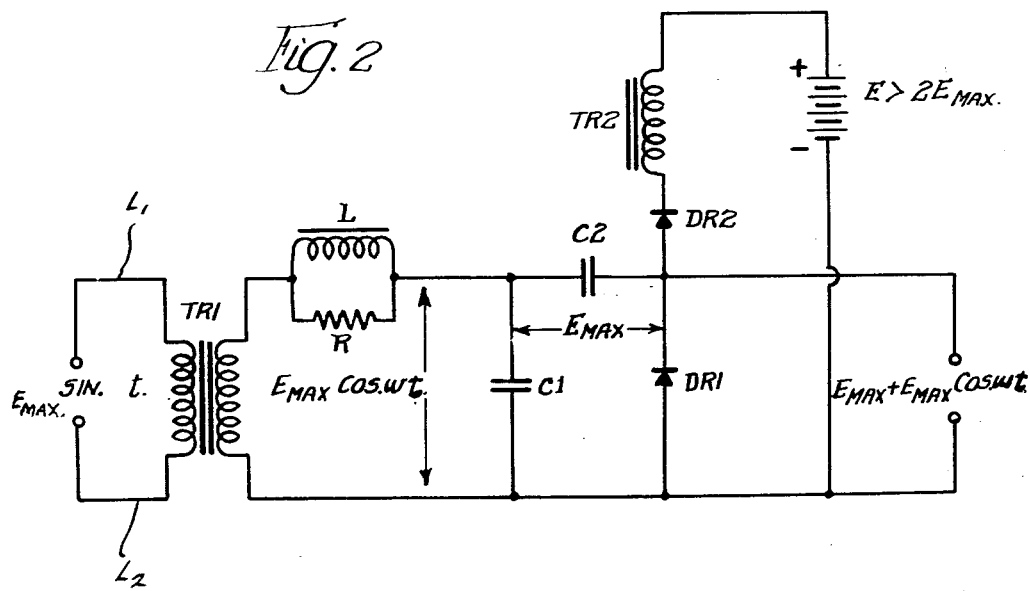
FIGURE 2 is a diagrammatic view showing a circuit capable of producing a synthesized waveform as illustrated in FIGURE 1.

The synchronous clamping arrangement as shown in FIGURE 2 will, therefore, adjust the charge on condenser C2 for each cycle so as to conform to the variations in the voltage supplied to the input terminals $L_1$ and $L_2$.

FIGURE 3 is a wiring diagram showing a single phase compensating circuit which embodies in a practical manner the synchronous clamping arrangement as diagrammatically illustrated in FIGURE 2. The line voltage is sensed by the transformer 10 having the primary 11 which is directly connected to a source of alternating current voltage by the terminals $L_1$ and $L_2$. The secondary windings 12 and 13 of transformer 10 are suitably connected by conductors 14 and 15 to the potentiometer 16 having the adjustable divider 17. From the potentiometer the voltage is fed to an electric circuit including the inductance winding 18, the resistor 20 and the condenser 21. The output of the resonance circuit is obtained across the terminals 22 and 23 and the same will be a pure sine wave free of any spikes or sharp transients. However, the "Q" of the filter should be low enough to allow rapid changes in line voltage to be transmitted. The output of the resonance circuit is coupled by the condenser 24 to the rectifier 26, which serves as a clamp, all in a manner as explained in connection with FIGURE 2.

Also the rectifier 27 is used in conjunction with the secondary winding 28 of the peaking transformer 30 to provide synchronous clamping in order to give the fastest possible recovery time to the system. The power supplied to the peaking transformer 30 is ninety degrees out of phase with that supplied to the transformer 10. A clamped sine wave is applied to the grid of the tube 31 having the plate 32, the cathode 33, and the control grid 34. The form of this sine wave is illustrated in FIGURE 5B, wherein it will be observed that the same is a direct current pulsating voltage having sinusoidal waveform similar to that shown in FIGURE 5A, although phase shifted substantially ninety degrees as a result of the action of the resonance circuit, including the inductance winding 18 and the condenser 21. In accordance with the invention, it is thus possible to adjust the amount of phase shift since the inductance winding 18 is provided with an adjustable iron core for this purpose. For tube 31 a 12AX7 may be selected since it is desired that the tube have a very high mu and a sharp cut-off characteristic. Therefore, when the grid 34 is sufficiently positive to cause conduction, full conduction is reached almost immediately and when the grid voltage goes below this value, the tube is then completely cut off. For a graphic representation of this action reference is made to FIGURE 5D.

The plate-cathode circuit of tube 31 includes a power supply and a load resistor. The latter is indicated by numeral 36, the same being connected by conductor 37 to the positive side of the direct current supply, as clearly indicated by the rectifiers 38 which are suitably connected to the respective ends of the secondary winding 40 of the main power transformer 10. The negative side of the power supply is completed by conductor 41, the same including the adjustable tap 42 and which is connected at 43 with the cathode 33 of said tube 31. The cathode of this tube is set at a desired direct current reference level by means of a voltage divider to be presently described. The winding 28 of the peaking transformer 30 is connected by the conductor 45 to the positive side of a direct current power supply including the voltage regulator tube 46. Conductor 45 is connected at 47 to the plate conductor 48 which constitutes the positive terminal of the direct current power supply, the same including the secondary winding 50 of the main power transformer 10. The rectifiers 51 are suitably connected to the respective terminals of the secondary winding 50 for rectifying the current obtained from the main power transformer. The negative side of the power supply is completed by the conductor 52 which includes the adjustable tap 53 and the voltage regulator tube 46. Said tube is gas filled and is of the cold cathode type. In operation said tube will supply a fixed output voltage irrespective of voltage changes as regards the supply current and irrespective of any changes which may take place in the load.

As clearly evident from FIGURE 5B, the preset value of the voltage on the cathode 33 of the tube 31 will determine the firing angle for the voltage compensating circuit. From said figure it will be observed that the direct current reference level has been set so as to produce firing pulses at the phase shift angle as shown. In order to provide for adjustment of said cathode voltage the invention provides the voltage divider 44 which is of a type to give vernier control with no gaps. Resistors 54 and 55 are connected to terminals 56 and 57, respectively, and which are arranged in a circle for selective connection by means of pointers 58 and 59. It will be noted that the pointers are ganged together for simultaneous rotation. The pointers 58 and 59 are connected by conductors 60 and 61 to each other through the resistor 62. The left end terminal 57 is joined by conductor 63 to resistor 64 and which is adjustably tapped by 65. Said tap is joined to conductor 66 having resistor 67 and which is connected at 68 to the positive side of the direct current source. In a somewhat similar manner the right end terminal 56 is joined by conductor 70 to resistor 71, the same having the adjustable tap 72 and which is connected through conductor 73 with the negative side of the system represented by conductor 15. The potentiometer represented by resistor 64 and tap 65 will give high limit control as regards the voltage regulator, whereas, resistor 71 and tap 72 will give control of the low limit. The adjustable tap 74, having contact with resistor 62, will give the desired vernier control of the direct current voltage applied to cathode 33, for which purpose the adjustable tap is connected to said cathode by conductor 75.

Tube 31 is condenser coupled to tube 76, the said coupling including the conductor 77 with interposed condenser 78. Accordingly, the output of tube 31 is supplied to grid 79 of tube 76 and the same is clamped to a zero level by means of the rectifier 80. The tube 76 is preferably a hot cathode thyratron such as a 2D21 having a plate 81 and a cathode 82. The plate-cathode circuit of the tube includes the primary winding 83 of the output transformer 84 and by means of conductor 85 the condenser 86 is also included in said circuit since the conductor 85 and also the cathode conductor 87 connect with the negative side of the system as represented by conductor 15.

When tube 31 ceases to conduct, the grid voltage on tube 76 becomes zero and said tube 76 is thereupon rendered conductive. This is graphically represented by the curves, FIGURES 5D and 5E, the former showing waveforms characteristic of tube 31 and which take place at point 35 in the plate circuit of the tube, and the latter illustrating waveforms with respect to tube 76 and which take place at point 88 in the plate circuit of said tube. The firing of tube 76 discharges the condenser 86 through the winding 83 of the output transformer 84 and accordingly said transformer produces a voltage pulse which is used to drive three of the five multivibrators shown in FIGURE 4.

The voltage pulses which occur three hundred and sixty degrees apart are graphically illustrated in FIGURE 5F. The condenser 86 is recharged by means of the peaking transformer 30 and which includes the secondary winding 29 of said transformer in combination with the rectifier 89. The said charging of the condenser takes place during each cycle when the grid of tube 76 is negative.

The voltage pulses produced by the primary winding 83 of the transformer 84 are supplied to multivibrators having connection in a circuit as shown in FIGURE 4. The multivibrators have certain delay characteristics so that individual voltage pulses are delivered at the proper times for firing the six ignitrons of a three-phase welding machine. It is possible by means of the multivibrators to maintain the firing pulses in proper relationship to their respective phase for any particular phase shift setting of the voltage compensating circuit. Conductor 90 has connection with the positive side of the power supply having the secondary winding 50 of the main transformer 10, and this conductor is connected in turn to the plate circuits of the multivibrators. In a similar manner conductor 91 has connection to the negative side of the power supply and this conductor is in turn connected to the cathodes, respectively, of the several multivibrators.

The voltage pulses from the primary winding 83 of the transformer 84 are delivered to the secondary winding 92 of said transformer and said pulses are passed by the rectifier 93 to the control grids 94, 95 and 96 of the multivibrators 97, 98 and 99, respectively. The control grids 100 and 101 of the multivibrators 102 and 103 receive the pulses from multivibrator 99 in a manner to be presently described. Considering first the multivibrator 97, it will be understood that the same essentially consists of a tube of the dual triode, hot cathode type such as 6463, which is characterized by a low internal voltage drop when conducting. The tube includes two plates 104 and 105, and two cathodes 106 and 107, which are connected through a resistor 108 to the conductor 110 having connection with conductor 91. The circuit for the plate 105 includes the primary winding 111 of a transformer 112 and between the control grid 113 and said plate circuit there is connected an adjustable potentiometer 114 by means of which it is possible to adjust the delay period controlled by this particular tube. Through conductor 115 the plates 104 and 105 are connected to conductor 90.

The multivibrator 98 is similar to 97. However, for differentiating purposes the primary winding in the circuit of plate 105 will be identified by numeral 116 and the transformer by numeral 117. The potentiometer is identified by numeral 118. The multivibrators 99, 102 and 103 are likewise similar and to distinguish these tubes from each other the primary windings are identified by numerals 120, 121 and 122, for the transformers 123, 124 and 125, respectively. The adjustable potentiometers are identified by numerals 126, 127 and 128. Between the plate circuit and the cathode circuit for each of the multivibrators there is connected a condenser 130 which functions as a decoupling condenser for the multivibrators so that upon flip-flop conduction by one multivibrator the remaining will not be affected in any manner.

It was previously explained that the pulse produced by the voltage compensating circuit is delivered to tubes 97, 98 and 99. In accordance with the invention, the pulse delivered to multivibrator 99 is used to drive the remaining two multivibrators 102 and 103. For this purpose the transformer 123 is provided with the secondary winding 131. One end of said winding has connection with the conductor 110 which in turn joins with the cathodes of the tubes 99, 102 and 103, and connects them to the conductor 91 constituting the negative terminal of the direct current power source as described. The other terminal of winding 131 has connection with the filter circuit including rectifiers 132 and condenser 133 and through conductors 134 and 135 the positive pulses produced by secondary winding 131 are delivered to grids 100 and 101 of the tubes 102 and 103.

During normal operating conditions of the multivibrators the right side of each will conduct. In other words, for tube 97 it will be understood that conduction will normally take place between plate 105 and cathode 107. The cathode voltage developed across resistor 108 will hold the left side of each multivibrator in a non-conducting state. When a positive pulse is applied to grid 94, for example, of said tube 97, it will start conduction between plate 104 and cathode 106 and as a result a negative pulse is produced on grid 113 at the right side of the tube. This negative pulse on grid 113 terminates conduction of the right side and the same will remain in a non-conducting state until condenser 136 is charged through potentiometer 114 and resistor 137. Upon the charging of condenser 136 to a predetermined value the grid 113 is again rendered positive with respect to its cathode and thus conduction is resumed again between plate 105 and cathode 107. Upon conduction again taking place on the right side of the tube a pulse of positive polarity is developed across the windings 111 of the transformer 112 and this pulse is used as one of the firing pulses for the three-phase welding machine. Conduction of the right side produces a positive bias on the cathodes and cuts off conduction on the left side of the tube. No further action occurs until another pulse is applied to grid 94. The delay following the delivery of the pulse to grid 94, until a pulse of positive polarity is produced in windings 111, can be adjusted by the potentiometer since the potentiometer controls the time constant of the charging circuit.

Simultaneously with the delivering of a pulse to grid 94 it will be understood that a pulse is similarly delivered to grids 95 and 96. In operation the tubes 98 and 99 are similar to that of 97 with the exception that the potentiometers of each have been adjusted to give different delay periods, all as required for the particular phase controlled by the respective tube. For multivibrator 97 the potentiometer 114 is adjusted for a delay of one hundred and twenty degrees. For multivibrator 98 the delay period is sixty degrees. For the multivibrator 99 the delay is one hundred and eighty degrees. From this latter multivibrator the pulse generated in its transformer 123 is delivered respectively to the grids 100 and 101 of the multivibrators 102 and 103. The delay period effected by multivibrators 102 and 103 is accordingly measured with respect to 99 and the potentiometers 127 and 128 thereof are set for delays of one hundred and twenty degrees and sixty degrees, respectively.

The waveforms which appear at various points in the circuit of the multivibrators have been graphically illustrated in FIGURES 6A and 6E. The 6463 tube has been chosen for this circuit because of high perveance and sharp cut off characteristics. It is desirable to use high quality condensers in the timing circuit in order to minimize variations in timing due to temperature changes.

Reference is made to FIGURE 7 for an illustration of the manner in which the transformers of the various multivibrators are connected so as to supply their firing pulses to the ignitrons of a three-phase welding machine. Numeral 142 represents the secondary winding of transformer 112 which has one end connected to the output conductor 143 for said transformer. Transformer 117 is provided with two secondary windings, namely 144 and 145, with conductor 146 delivering the pulse for winding 144 and conductor 147 delivering the pulse for winding 145. These secondary windings 144 and 145 are connected in reverse, as indicated by terminals 3, 4 and 6, 5, so that the pulses delivered by winding 145 are reversed in polarity from those produced by winding 144. This feature of the invention is graphically illustrated by the waveforms shown in FIGURES 8A to 8F and wherein FIGURE 8B shows the positive pulse for winding 144, the same being delayed sixty degrees, whereas, FIGURE 8C shows the positive pulses for winding 145 and which coincide in time with the pulses derived from transformer 84 in the voltage compensating circuit. The secondary winding for transformers 123, 124 and 125 are indicated by numerals 148, 149 and 150, and the terminal which delivers the pulse for the respective windings is indicated by numerals 151, 152, and 153. It will be observed by reference to FIGURE 8D that the pulse delivered by winding 148 is delayed one hundred and eighty degrees, with the pulses for windings 149 and 150 being delayed with respect thereto one hundred and twenty degrees and sixty degrees.

In the present voltage compensating circuit the shifting in the phase relation of the firing pulses with respect to the line voltage is automatic and continuous and the same compensates to the full extent possible for any variations taking place in the line voltage. For example, a drop in line voltage will advance the firing angle, and conversely, an increase in line voltage will retard it, see FIGURE 1, since the magnitude of the synthesized voltage waveform at any selected phase angle is proportional to the output of the alternating current voltage for that particular phase angle. The voltage pulses produced by transformer 84 may be supplied to the ignitrons or other control valves of a single phase welder for firing them in a manner to maintain the secondary welding current at a constant value. The multivibrators are for use primarily where a number of firing pulses are required for multiphase operation. For three-phase welders the invention employs five multivibrators which will give a set of six firing pulses for each voltage pulse and wherein said firing pulses will be maintained in proper relation to their respective phase for any particular phase shift setting.

This application is a division of my copending application Serial No. 777,774, filed December 2, 1958, and entitled Automatic Voltage Compensator, now abandoned.

The invention is not to be limited to or by details of construction of the particular embodiment thereof illustrated by the drawings as various other forms of the device will, of course, be apparent to those skilled in the art without departing from the spirit of the invention or the scope of the claims.

What is claimed is:

1. In a voltage compensating circuit, the combination with a source of alternating current voltage, of a phase shift network including an electirc circuit containing inductance and capacitance, means applying said alternating current voltage across the input terminals of the electric circuit, an electric valve having a plate, a control grid and a cathode, said valve having a high mu and having sharp cut-off characteristics, means clamping the output terminals of the electric circuit to the grid and cathode of the valve whereby a voltage waveform for certain half cycles is applied to the grid the magnitude of which at any selected phase angle is proportional to the output of the respective half cycle of said voltage for the selected phase angle, a source of direct current voltage electrically connected to said valve for maintaining a preset voltage on the cathode thereof, whereby the valve is conductive only during those periods when the voltage applied by the voltage waveform is greater than the preset voltage, and additional means for translating the conductive periods of said valve into voltage pulses occurring at the phase angle as determined by the preset voltage.

2. A voltage compensating circuit as defined by claim 1, additionally including means associated with the inductance in the electric circuit for adjusting the phase relation between the voltage waveform and the alternating current voltage.

3. A voltage compensating circuit as defined by claim 1, additionally including adjustable means in association with the source of direct current voltage for manually setting the value of the voltage maintained on the cathode of said valve.

4. A voltage compensating circuit as defined by claim 1, additionally including a parallel circuit arrangement electrically connected to said phase shift network and including a plurality of constant delay monostable multivibrators, whereby said voltage pulses are supplied to each of said multivibrators, and electrical means in said parallel circuit arrangement for each multivibrator and in electrical connection with the output of its multivibrator for delivering a firing pulse for each voltage pulse and which are delayed with respect to the voltage pulses according to the delay setting for its particular multivibrator.

5. In a voltage compensating circuit, the combination with a source of alternating current voltage, of a phase shift network including a resonance circuit containing an inductance coil and a condenser, means applying said alternating current voltage across the input terminals of the resonance circuit, an electric valve having a plate, a control grid and a cathode, said valve having a high mu and having sharp cut-off characteristics, means condenser coupling the output terminals of the resonance circuit to the grid and cathode of the valve and rectifier means for clamping the same, whereby a pulsating direct current voltage is applied to the grid and which has a waveform the magnitude of which at any selected phase angle is proportional to the output of the alternating current voltage for that particular phase angle, a source of direct current voltage electrically connected to said valve for maintaining a preset voltage on the cathode thereof, whereby the valve is conductive only during the periods the pulsating direct current voltage applied to the grid is greater than the preset voltage, a second electric valve also having a plate, a control grid and a cathode, means condenser coupling the plate of the first valve to the grid of the second valve, whereby the second valve is conductive during those periods when the first valve is nonconductive, a condenser and a transformer winding in the plate-cathode circuit of the second valve, whereby the condenser is discharged through the transformer winding by the conduction of the second valve to produce voltage pulses in the transformer winding at the phase angle as determined by the preset voltage.

References Cited in the file of this patent
UNITED STATES PATENTS

| | | |
|---|---|---|
| 2,410,156 | Fiory | Oct. 29, 1946 |
| 2,731,634 | Palmer | Jan. 17, 1956 |
| 2,864,954 | Byrne | Dec. 16, 1958 |